(12) United States Patent
Prampolini et al.

(10) Patent No.: US 12,528,601 B2
(45) Date of Patent: Jan. 20, 2026

(54) PASSENGER TRANSPORT SYSTEM PROPELLED BY A SPACE LAUNCHER, HAVING A SEAT WITH VARIABLE INCLINATION BASED ON THE LOAD FACTOR

(71) Applicant: ARIANEGROUP SAS, Les Mureaux (FR)

(72) Inventors: Marco Prampolini, Le Haillan (FR); Jean-Philippe Dutheil, Le Haillan (FR); Yoan Boue, Le Haillan (FR)

(73) Assignee: ARIANEGROUP SAS, Les Mureaux (FR)

( * ) Notice: Subject to any disclaimer, the term of this patent is extended or adjusted under 35 U.S.C. 154(b) by 77 days.

(21) Appl. No.: 18/552,079

(22) PCT Filed: Mar. 17, 2022

(86) PCT No.: PCT/FR2022/050485
§ 371 (c)(1),
(2) Date: Jan. 28, 2025

(87) PCT Pub. No.: WO2022/200714
PCT Pub. Date: Sep. 29, 2022

(65) Prior Publication Data
US 2025/0361037 A1    Nov. 27, 2025

(51) Int. Cl.
*B64G 1/60* (2006.01)
*B64G 1/00* (2006.01)
*B64G 1/54* (2006.01)

(52) U.S. Cl.
CPC .............. *B64G 1/60* (2013.01); *B64G 1/002* (2013.01); *B64G 1/543* (2013.01)

(58) Field of Classification Search
CPC .......... B64G 1/60; B64G 1/002; B64G 1/543
See application file for complete search history.

(56) References Cited

U.S. PATENT DOCUMENTS 5,979,827 A * 11/1999 Corcoran ............... B64D 11/00
244/122 AG
6,216,984 B1 * 4/2001 Brinsmade ............... B64G 1/12
244/159.4
(Continued)

FOREIGN PATENT DOCUMENTS

RU        2586747 C1    6/2016

OTHER PUBLICATIONS

French Search Report issued in French Application No. 2102868 on Dec. 2, 2021.
(Continued)

*Primary Examiner* — Valentina Xavier
(74) *Attorney, Agent, or Firm* — Bookoff McAndrews, PLLC

(57) ABSTRACT

A transport system intended to be installed on a space launcher comprises: an aircraft which comprises propulsion means configured to propel the aircraft in a direction of flight, and at least one seat intended to receive a passenger which is movable in rotation about an axis perpendicular to the direction of flight of the aircraft, an acceleration sensor being installed on each at least one seat to measure the acceleration of each at least one seat; a passenger interface for each at least one seat which comprises a screen intended to display images to the passenger installed on said at least one seat, the screen being coupled to said at least one seat so to remain fixed relative to said at least one seat; a control unit which is connected to the acceleration sensor and to said at least one seat.

9 Claims, 3 Drawing Sheets

(56) References Cited

U.S. PATENT DOCUMENTS

| | | |
|---|---|---|
| 2002/0074457 A1 | 6/2002 | Barutt |
| 2010/0240454 A1 | 9/2010 | Xiao |
| 2014/0124626 A1 | 5/2014 | Clay |
| 2020/0143951 A1 | 5/2020 | Harris, Jr. et al. |

OTHER PUBLICATIONS

Search Report and Written Opinion issued in International Application No. PCT/FR2022/05045, mailed on Jun. 9, 2022.

* cited by examiner

[Fig. 1]
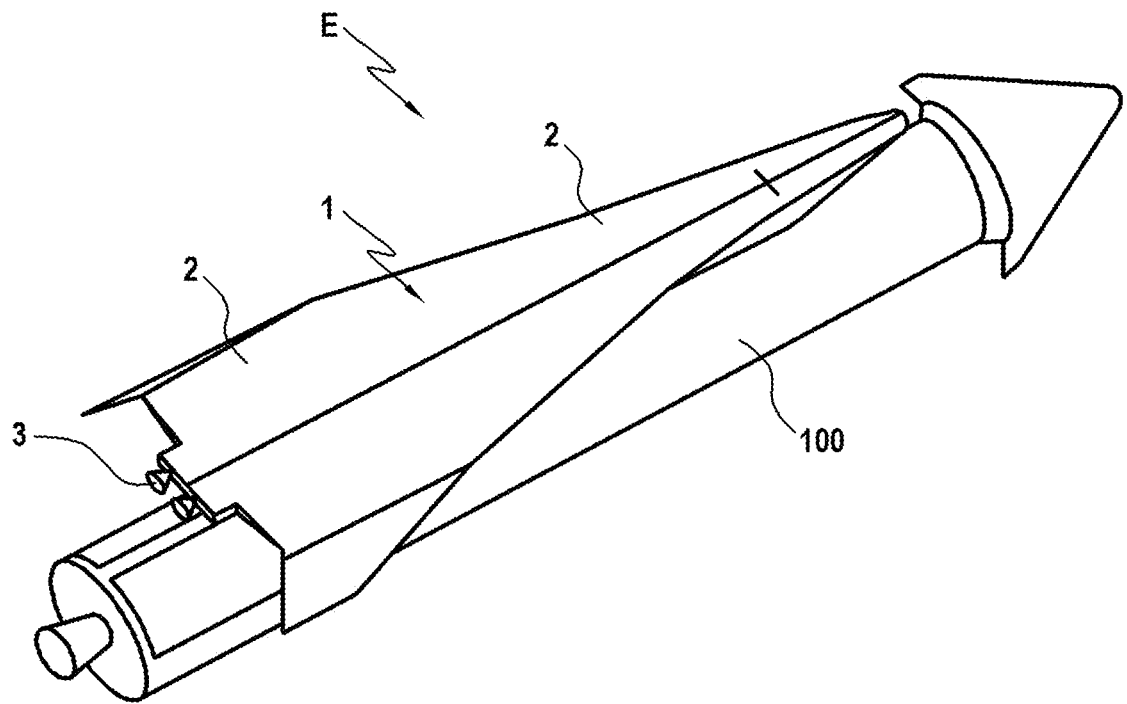
[Fig. 2]
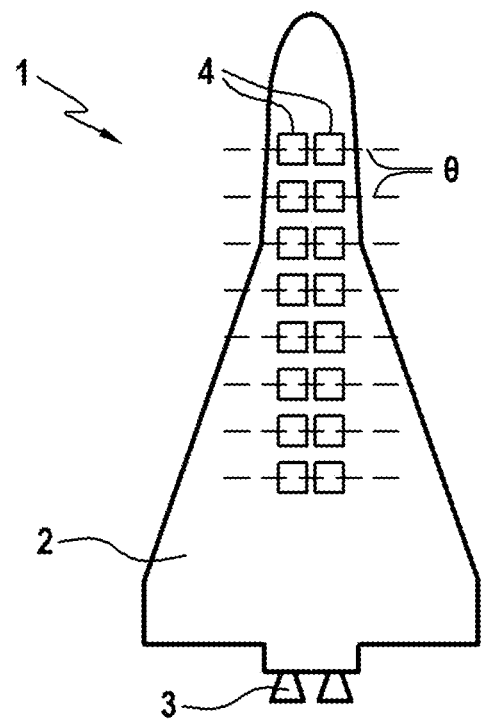

[Fig. 3]
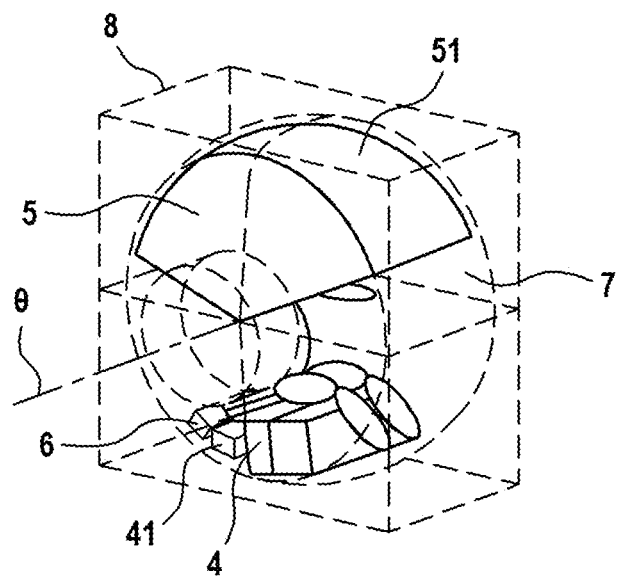
[Fig. 4]
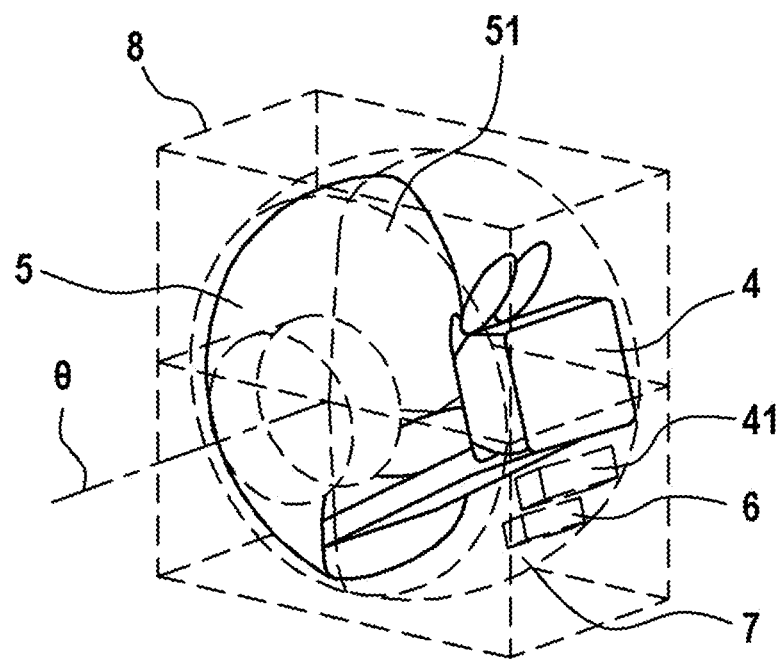

[Fig. 5]
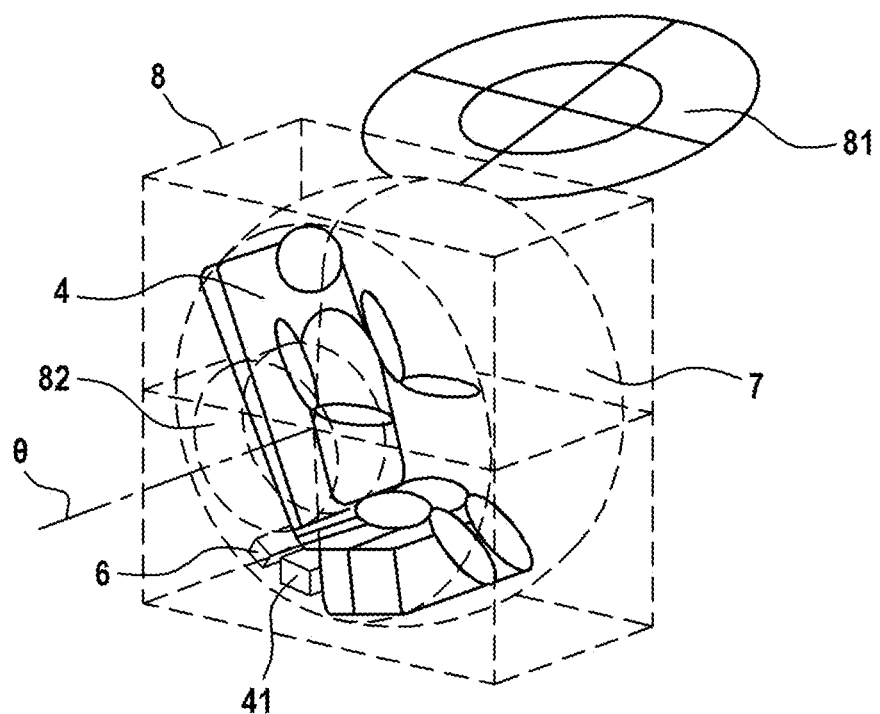

PASSENGER TRANSPORT SYSTEM PROPELLED BY A SPACE LAUNCHER, HAVING A SEAT WITH VARIABLE INCLINATION BASED ON THE LOAD FACTOR

CROSS-REFERENCE TO RELATED APPLICATIONS

This is a National Stage Application under 35 U.S.C. § 371 of International Application No. PCT/FR2022/050485, filed Mar. 17, 2022, now published as WO 2022/200714 A1, which claims priority to French Patent Application No. 2102868, filed on Mar. 23, 2021.

TECHNICAL FIELD

The invention relates to a passenger transport system propelled by an aerospace launcher, that is to say a transport system which is installed on a space launcher and which is separated from said space launcher when the space transport reaches the desired speed and altitude.

PRIOR ART

Passenger transport systems that are propelled by a space launcher are known.

Generally, such transport systems perform maneuvers with non-rectilinear trajectories which may require specific training so that the passengers can bear them, in particular because of the high speed of such transport systems.

DISCLOSURE OF THE INVENTION

The main purpose of the present invention is therefore to propose a transport solution that helps to make the non-rectilinear trajectories of the transport system more bearable for the passengers during the movement of the transport system.

According to a first aspect, the invention relates to a vehicle, such as an aircraft, comprising at least one seat intended to receive a passenger, said seat or each of said seats being movable in rotation about an axis perpendicular to the direction of movement of the vehicle and including:
- an acceleration sensor to measure the acceleration of each at least one seat;
- a passenger interface comprising a screen intended to display images to the passenger installed on said seat, the screen being coupled to the seat with which it is associated so as to remain in a fixed position relative to said seat, and
- a control unit which is connected to the acceleration sensor and to the associated seat, the control unit being configured, on the one hand, to calculate a load factor experienced by the passenger installed on the at least one seat from the acceleration of said at least one seat and, on the other hand, to monitor the rotation of said seat during the operation of the transport system in order to maintain the position of the seat fixed relative to the load factor experienced by the passenger throughout the flight.

Such a system is in particular advantageous because it allows the passenger to better withstand the load factor experienced during the flight.

According to one possible characteristic, said at least one seat is fixedly mounted in a rotating cabin along said axis installed in the vehicle.

According to one possible characteristic, the rotating cabin is installed in a chamber which is fixed in the vehicle, the rotating cabin being movably mounted in rotation along the axis in said chamber.

According to one possible characteristic, the chamber comprises two openings intended to allow the passage of the passenger, a first opening forming a main opening for the installation and the departure of the passenger, a second opening forming an emergency exit, the first opening having a larger size than the second opening.

According to one possible characteristic, the rotating cabin comprises a radiation shielding coating.

According to one possible characteristic, the radiation shielding coating is made of polyethylene.

According to one possible characteristic, the control unit is configured to maintain the speed of rotation of the at least one seat below a predefined threshold speed.

According to one possible characteristic, the screen is configured to cover the entire field of vision of the passenger installed on the seat.

According to one possible characteristic, the passenger interface comprises an audio speaker.

According to a second aspect, the invention relates to an assembly comprising a space launcher and a vehicle according to any one of the preceding characteristics installed on said space launcher.

BRIEF DESCRIPTION OF THE DRAWINGS

Other characteristics and advantages of the present invention will become apparent from the description given below, with reference to the appended drawings which illustrate one exemplary embodiment without any limitation.

FIG. 1 schematically represents a transport system installed on a space launcher.

FIG. 2 schematically represents the installation of seats in the transport system of FIG. 1.

FIG. 3 schematically represents a chamber comprising a rotating cabin in which a passenger seat is installed.

FIG. 4 schematically represents the chamber of FIG. 3 in which the seat is inclined in order to follow the load factor experienced by the passenger.

FIG. 5 schematically represents the chamber of FIG. 3 in which a main opening is open, the user interface not being represented.

DESCRIPTION OF THE EMBODIMENTS

FIG. 1 illustrates an assembly E comprising a transport system 1 which is installed on an aerospace launcher 100. The transport system 1 is intended for the transport of at least one passenger. The transport system 1, thanks to the thrust generated by the space launcher 100 can reach a hypersonic speed, for example between Mach 5 and Mach 10, thus making it possible to make journeys of more than 10,000 kilometers in less than two hours.

The transport system 1 is preferably a vertical take-off and landing transport system.

The space launcher 100 comprises a rocket engine which can for example be a solid propellant rocket engine. The rocket engine can also be a liquid propellant rocket engine. The space launcher 100 is preferably a reusable space launcher that is configured to return for landing on a target base after having detached from the transport system 1.

The transport system 1 comprises an aircraft 2 which has a shape suitable for hypersonic speeds. The aircraft 2 comprises propulsion means 3 which are configured to propel the aircraft 2 in a direction of flight, the direction of flight of the aircraft 2 being in particular determined by the shape of the aircraft 2. The propulsion means 3 are re-ignitable propulsion means, and whose generated thrust is variable. The propulsion means 3 can for example comprise a liquid propellant rocket engine.

As illustrated in FIG. 2, at least one seat 4 is installed inside the aircraft 2, the seats 4 being intended to receive a passenger 5 during the flight of the transport system 1. The variant illustrated in FIG. 2 advantageously comprises a plurality of seats 4 which are installed inside the aircraft 2. The seats 4 can be seats in the seated position or in the lying position, or seats movable between a seated position and a lying position.

The seats 4 are installed in the aircraft 2 so as to be movable in rotation about an axis 0 which is perpendicular to the direction of flight of the aircraft, as illustrated in FIG. 2.

The seats 4 each comprise an acceleration sensor 41 which is configured to measure the acceleration experienced by the seat 4 on which the acceleration sensor 41 is installed. The acceleration sensor 41 measures the direction and the standard of the acceleration of the seat 4.

The transport system 1 also comprises at least one passenger interface 5, each passenger interface 5 being associated with a seat 4 and is configured to display images to the passenger when the latter is installed on said seat 4.

As illustrated in FIGS. 3 and 4, the passenger interface 5 comprises a screen 51 which is located facing the area of the seat 4 intended to receive the passenger's head. The screen 51 is secured to the seat 4 so as to follow the rotational movements of said seat 4 and thus be fixed relative to said seat 4. The screen 51 preferentially covers the entire field of vision of the passenger when the passenger is installed in the seat 4.

The passenger interface 5 can also comprise an audio speaker which makes it possible to broadcast a sound to the passenger when said passenger is installed in the seat 4.

The transport system 1 also comprises a control unit 6 which is connected to each seat 4, to each acceleration sensor 41, and to each user interface 5. The control unit 6 comprises a memory on which a method is recorded and a processor configured to implement the method recorded on the memory.

For each seat 4, the control unit 6 uses the acceleration of the seat 4 measured by the acceleration sensor 41 to calculate the load factor undergone by said seat 4, and therefore by the passenger installed on the seat. The control unit 6 calculates the direction and the standard of the load factor. The calculation of the load factor of each seat by the control unit 6 is made in real time and is continuous throughout the flight.

From the calculated load calculation, for each seat 4, the control unit 6 monitors the rotation of the seat 4 about the axis 0 in order to maintain the seat 4 fixed relative to the load factor undergone by said seat 4, and therefore fixed relative to the load factor experienced by the passenger installed on said seat 4. Such a rotation of the seat 4 is for example illustrated in FIG. 4. To do so, the control unit 6 can for example monitor a servomotor which drives the seat 4 in rotation about the axis 0.

The fact that the seat 4 follows the load factor experienced by the passenger during the flight makes it possible to deceive the passenger's feeling in order to give him the impression that the trajectory followed by the transport system is always rectilinear during the flight.

Furthermore, the fact that the passenger remains fixed relative to the experienced load factor makes said load factor experienced during the flight more easily bearable, the load factor experienced by the passenger remaining in the most comfortable direction for said passenger. For example, a load factor experienced from the front is more comfortable than a load factor of the same standard directed from the top down for the passenger, head to foot.

The presence of the passenger interface 5 which displays images with a screen 51 that remains fixed in the passenger's frame of reference during the flight makes it possible to accentuate the decoy for the senses of said passenger.

The control unit 6 preferably limits the speed of rotation of the seats 4 below a threshold speed of rotation which is predefined in order to improve the passenger comfort.

As illustrated in FIGS. 3 to 5, each seat 4 can be integrated into a rotating cabin 7. Each seat 4 is fixedly installed in the rotating cabin 7 so that the rotation of the seat 4 about the axis 0 is obtained by rotation of the rotating cabin 7 about said axis 0. The rotating cabin 7 can, as in the variant of embodiment illustrated in the figures, be in the form of a cylinder of revolution of axis 0, the seat 4 being installed inside the cylinder. The screen 51 of the passenger interface 5 can be disposed on the internal surface of the cylinder, facing the area of the seat 4 intended to receive the passenger's head so as to cover the entire field of vision of the passenger. Preferably, each rotating cabin 7 contains a single seat 4. Such a rotating cabin 7 makes it possible to accentuate the decoy of the passenger senses because the entire environment of the passenger remains fixed in his frame of reference.

Each rotating cabin 7 can be installed in a chamber 8, the rotating cabin 7 being movably mounted in rotation along the axis 0 in said chamber 8. The chamber 8 is intended to be installed in the aircraft 2 so as to remain fixed relative to said aircraft 2. Such a chamber 8 allows easier embarkation and disembarkation of the passengers by simply loading and unloading the chambers 8.

In the variant illustrated in FIG. 5, the chamber 8 comprises a first opening 81 which forms a main opening through which the passenger passes to settle in the rotating cabin 7 or to leave said rotating cabin 7. The chamber 8 also comprises a second opening 82, which comprises a smaller size than the first opening 81 and which is located on a different side of said chamber 8. The second opening 82 forms an emergency opening through which the passenger can pass in the event of an emergency.

The rotating cabin 7 can comprise a radiation shielding coating, which can for example be made of polyethylene, and in particular high-density polyethylene. The shielding coating ensures protection for the passenger against the radiation emitted by the sun during the flight.

The invention claimed is:

1. A vehicle comprising at least one seat intended to receive a passenger, said seat or each of said seats being movable in rotation about an axis perpendicular to the direction of movement of the vehicle and including:
   an acceleration sensor to measure the acceleration of each at least one seat,
   a passenger interface comprising a screen intended to display images to the passenger installed on said seat, the screen being coupled to the seat with which it is associated so as to remain in a fixed position relative to said seat, and
   a control unit which is connected to the acceleration sensor and to the associated seat, the control unit being configured, on the one hand, to calculate a load factor experienced by the passenger installed on the corresponding seat from the acceleration of said seat and, on the other hand, to monitor the rotation of said seat during the operation of the transport system in order to maintain the position of the seat fixed relative to the load factor experienced by the passenger throughout the flight, the screen being configured to cover the entire field of vision of the passenger installed on the seat.

2. The vehicle according to claim 1, wherein said at least one seat is fixedly mounted in a rotating cabin along the axis installed in the vehicle.

3. The vehicle according to claim 2, wherein the rotating cabin is installed in a chamber which is fixed in the vehicle, the rotating cabin being mounted in rotation along the axis in said chamber.

4. The vehicle according to claim 3, wherein the chamber comprises two openings intended to allow the passage of the passenger, a first opening forming a main opening for the installation and the departure of the passenger, a second opening forming an emergency exit, the first opening having a larger size than the second opening.

5. The vehicle according t claim 2, wherein the rotating cabin comprises a radiation shielding coating.

6. The vehicle according to claim 5, wherein the radiation shielding coating is made of polyethylene.

7. The vehicle according to claim 1, wherein the control unit is configured to maintain the speed of rotation of the seat below a predefined threshold speed.

8. The vehicle according to claim 1, wherein the passenger interface comprises an audio speaker.

9. An assembly comprising a space launcher and a vehicle installed on said space launcher, the vehicle comprising at least one seat intended to receive a passenger, said seat or each of said seats being movable in rotation about an axis perpendicular to the direction of movement of the vehicle and including:

an acceleration sensor to measure the acceleration of each at least one seat, a passenger interface comprising a screen intended to display images to the passenger installed on said seat, the screen being coupled to the seat with which it is associated so as to remain in a fixed position relative to said seat, and a control unit which is connected to the acceleration sensor and to the associated seat, the control unit being configured, on the one hand, to calculate a load factor experienced by the passenger installed on the corresponding seat from the acceleration of said seat and, on the other hand, to monitor the rotation of said seat during the operation of the transport system in order to maintain the position of the seat fixed relative to the load factor experienced by the passenger throughout the flight, the screen being configured to cover the entire field of vision of the passenger installed on the seat.

* * * * *